(12) United States Patent
Wu et al.

(10) Patent No.: US 11,909,674 B2
(45) Date of Patent: Feb. 20, 2024

(54) WAKE-UP MECHANISMS IN WIRELESS COMMUNICATIONS

(71) Applicant: ZTE Corporation, Guangdong (CN)

(72) Inventors: Hao Wu, Guangdong (CN); Mengzhu Chen, Guangdong (CN); Jun Xu, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 594 days.

(21) Appl. No.: 17/133,993

(22) Filed: Dec. 24, 2020

(65) Prior Publication Data
US 2021/0119742 A1 Apr. 22, 2021

Related U.S. Application Data

(63) Continuation of application No. PCT/CN2018/094832, filed on Jul. 6, 2018.

(51) Int. Cl.
H04W 72/04 (2023.01)
H04L 5/00 (2006.01)
H04B 7/06 (2006.01)
H04W 24/08 (2009.01)
H04W 56/00 (2009.01)
(Continued)

(52) U.S. Cl.
CPC ......... *H04L 5/0023* (2013.01); *H04B 7/0626* (2013.01); *H04W 24/08* (2013.01); *H04W 56/001* (2013.01); *H04W 72/0446* (2013.01); *H04W 72/0453* (2013.01); *H04W 72/30* (2023.01); *H04W 72/53* (2023.01)

(58) Field of Classification Search
CPC ... H04L 5/0023; H04L 5/0048; H04L 5/0053; H04L 5/0094; H04B 7/0626; H04W 24/08; H04W 56/001; H04W 72/0446; H04W 72/0453; H04W 72/30; H04W 72/53; H04W 72/046; H04W 52/0216; H04W 52/0254; H04W 76/28; Y02D 30/70
See application file for complete search history.

(56) References Cited

U.S. PATENT DOCUMENTS

2017/0202025 A1 7/2017 Ouchi et al.
2018/0014251 A1* 1/2018 Sambhwani ...... H04W 52/0212
(Continued)

FOREIGN PATENT DOCUMENTS

CN 104798321 A 7/2015
CN 106416401 2/2017
(Continued)

OTHER PUBLICATIONS

CNIPA, Notification to Complete Formalities of Registration for Chinese Application No. 201880095035.4, dated Feb. 17, 2023, 4 pages with unofficial translation.
(Continued)

*Primary Examiner* — Mahbubul Bar Chowdhury
(74) *Attorney, Agent, or Firm* — Perkins Coie LLP

(57) ABSTRACT

A wireless communication method includes receiving, by a communication node, a first signal. The method further includes determining quasi co-location (QCL) information for the first signal based on at least one of a predefined rule and a configuration information from a base station, and performing a selective monitoring of a control channel based on information received in the first signal.

24 Claims, 6 Drawing Sheets

(51) Int. Cl.
*H04W 72/0446* (2023.01)
*H04W 72/0453* (2023.01)
*H04W 72/30* (2023.01)
*H04W 72/53* (2023.01)

(56) References Cited

U.S. PATENT DOCUMENTS

| | | | |
|---|---|---|---|
| 2019/0074880 A1* | 3/2019 | Frenne | H04B 7/0617 |
| 2019/0306847 A1 | 10/2019 | Seo et al. | |
| 2020/0037247 A1* | 1/2020 | Liao | H04W 72/0453 |
| 2020/0351780 A1* | 11/2020 | Liao | H04W 76/27 |
| 2021/0007051 A1* | 1/2021 | Tang | H04W 52/0229 |
| 2021/0007054 A1* | 1/2021 | Jiang | H04W 52/0235 |
| 2021/0014786 A1* | 1/2021 | Shi | H04W 72/044 |
| 2021/0045141 A1* | 2/2021 | Lee | H04L 5/0053 |
| 2021/0091900 A1* | 3/2021 | Zhang | H04W 56/001 |
| 2023/0145663 A1* | 5/2023 | Kwon | H04W 52/0232 370/318 |

FOREIGN PATENT DOCUMENTS

| | | |
|---|---|---|
| CN | 106576009 A | 4/2017 |
| CN | 106576030 A | 4/2017 |
| CN | 108024365 | 5/2018 |
| EP | 3154295 A1 | 4/2017 |
| WO | 2014/010911 | 1/2014 |
| WO | 2018/016907 A1 | 1/2018 |
| WO | 2018/021867 | 2/2018 |
| WO | WO-2019179261 A1 * | 9/2019 |

OTHER PUBLICATIONS

Vivo, "Remaining issues on QCL," 3GPP TSG RAN WG1 #92, Athens, Greece, R1-1801529, 4 pages, Feb. 26-Mar. 2, 2018.
International Search Report and Written Opinion, PCT/CN2018/094832, dated Mar. 28, 2019, 8 pages.
Extended Search Report for EP Application No. 189255293.2 dated Jun. 23, 2021, 11 pages.
Co-Pending EP Application No. 189255293.2 Article 94 Communication dated May 8, 2023, 7 pages.
Qualcomm Incorporated, "Wakeup Signaling for multi-beam system," 3GPP TSG-RAN WG2 Meeting RAN2 #99bis Prague, Czech, Oct. 9-13, 2017, R2-1711703, Resubmission of R2-1709116, 4 pages.
Vivo, "Remaining issues on QCL," 3GPP TSG RAN WG1 #92, Athens, Greece, Feb. 26-Mar. 2, 2018, R1-1801529, 4 pages.
Qualcomm Incorporated, "Remaining Details on QCL," 3GPP TSG RAN WG1 Meeting #92, Athens, Greece, Feb. 26-Mar. 2, 2018, R1-1802832, 12 pages.
Co-Pending CN Application No. 2018800950354, CN Office Action dated Aug. 30, 2022, 29 pages with unofficial translation.

* cited by examiner

WAKE-UP MECHANISMS IN WIRELESS COMMUNICATIONS

CROSS REFERENCE TO RELATED APPLICATIONS

This patent document is a continuation of and claims benefit of priority to International Patent Application No. PCT/CN2018/094832, filed on Jul. 6, 2018. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, and devices related to wireless communication, and more specifically, to techniques related to reducing the power consumption of wireless devices.

In one aspect, a wireless communication method is disclosed. The method includes receiving, by a communication node, a first signal. The method further includes determining quasi co-location (QCL) information for the first signal based on at least one of a predefined rule and a configuration information from a base station, and performing a selective monitoring of a control channel based on information received in the first signal.

In another aspect a wireless communication method is disclosed. The method includes transmitting, by a network node to a communication node, a first signal. Quasi co-location (QCL) information for the first signal is determined based on at least one of a predefined rule and a configuration information from a base station. The first signal provides the communication node information regarding performing a selective monitoring of a control channel.

In another aspect, the above-described methods may be implemented by a wireless communication apparatus. The apparatus may include a processor configured to implement the above-described methods and other variations described herein.

In yet another example aspect, the above-described methods may be embodied as processor-executable code that is stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only to improve readability and do not limit scope of the disclosed embodiments and techniques in each section to only that section.

With the development of wireless communication technologies, the performance, such as transmission rate, delay, throughput, and reliability of wireless communication systems has been greatly improved through technologies such as high frequency band, large bandwidth, and multiple antennas. On the other hand, to achieve high-performance wireless transmission, the user equipment performs more complex processing to meet the performance requirements. For example, the user equipment (also referred to herein as a terminal), detects a larger control channel bandwidth, is subject to more complex control information including data encoding, decoding processing, and the like. User equipment that operates at high frequencies may use a large bandwidth to achieve a high data rate or high-capacity transmission. This may use more computational resources which may result in high power consumption. Accordingly, reducing the power consumption at the user equipment is an important problem to be solved. The disclosed subject matter provides solutions reducing the power consumption of user equipment including operating at high frequencies.

Discontinuous reception (DRX) can be used to reduce user equipment power consumption. In a DRX working mode, the base station configures a DRX cycle for the terminal. During each DRX cycle, the terminal monitors the physical downlink control channel (PDCCH) at a predetermined time, if the terminal detects a signal on the PDCCH, then the terminal enters a working state and carries on the transmission and the reception of data and control information. Otherwise, the terminal remains in the inactive state. In an inactive state of a user equipment, a part of the transmission, reception, and/or processing circuitry may be shut down to reduce power consumption.

In the foregoing scheme, the terminal monitors the PDCCH periodically according to a predetermined period. In general, the terminal needs to blindly detect the PDCCH according to a certain mode. The complexity of blind detection is high and the terminal power consumption is high during blind detection. In addition, when operating a high frequency, the system bandwidth is large. The terminal monitors the PDCCH with a large bandwidth, which further improves the power consumption of the terminal. Even if DRX is used, the terminal to consumes a large amount of power to monitor the PDCCH and may not achieve a reduction in power consumption. By using the method disclosed herein, when certain performance requirements are satisfied, reduced power consumption can be achieved in a terminal operating at low-frequency or at high-frequency.

Examples of Wake-Up Mechanisms

Figure 1:
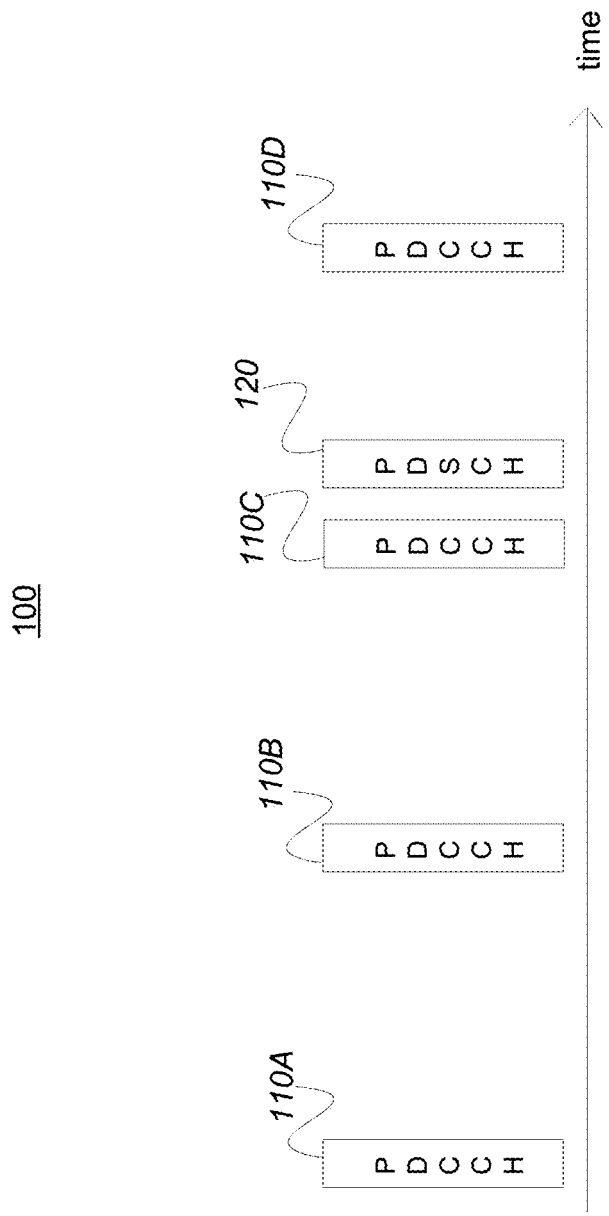
FIG. 1 depicts a timeline showing times when a terminal can monitor a channel, in accordance with some example embodiments.

In general, the terminal monitors the PDCCH according to a predetermined period to determine whether the base station schedules its own data transmission, reception, and measurement reporting of information. However, monitoring of the PDCCH consumes more power at the terminal. FIG. 1 at 100 illustrates a typical example of periodic PDCCH monitoring at times 110A-110D. The terminal monitors the PDCCH according to a predetermined period. In the example of FIG. 1, scheduling information is monitored at the third period (110C) where the terminal detects that physical downlink shared channel (PDSCH) 120 needs to be received on the PDCCH, and then performs the corresponding operations. If no scheduling information is detected, the terminal can enter the inactive mode in the DRX mode.

Figure 2:
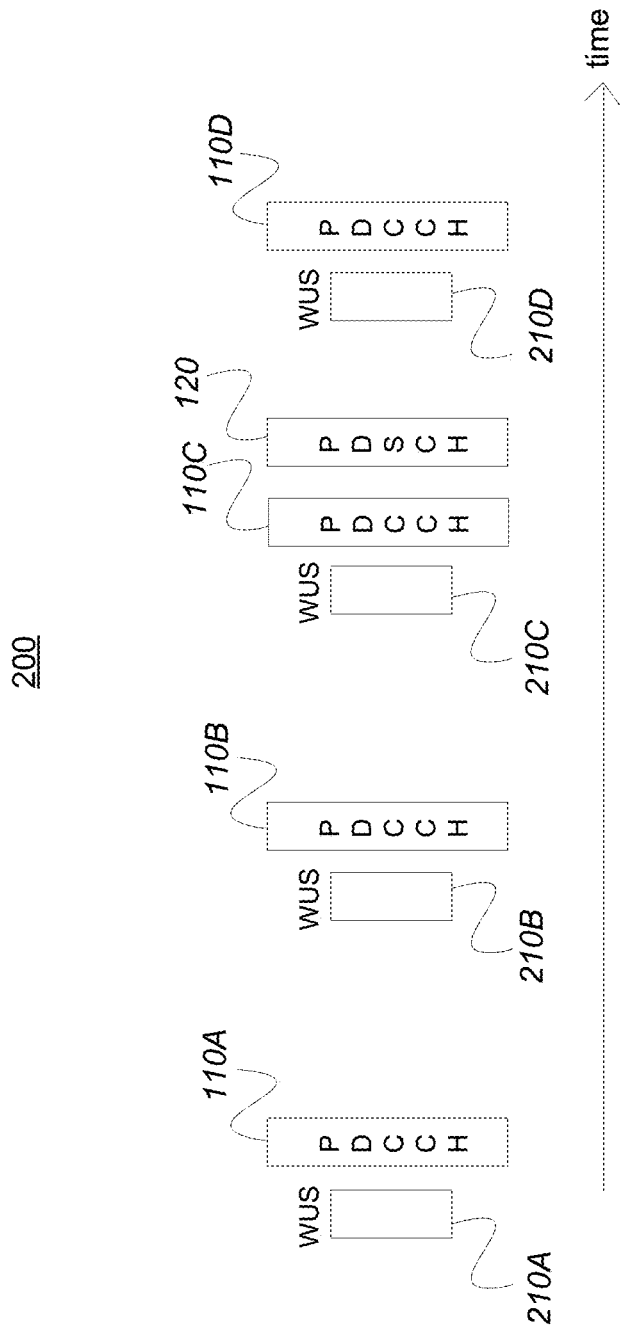
FIG. 2 depicts a timeline showing a wake-up signal (WUS), in accordance with some example embodiments.

In some embodiments of the disclosed method, before each potential PDCCH monitoring point, the base station sends a signal to indicate whether the terminal needs to monitor the PDCCH at the associated PDCCH monitoring point. The signal may be called a wakeup signal (WUS). If the signal is detected, the PDCCH is monitored at a potential PDCCH monitoring point. If the signal is not detected, the terminal monitoring result is DTX where the PDCCH is not monitored at the PDCCH monitoring point. FIG. 2 depicts examples of WUS timing positions 210A-210D. In the example of FIG. 2, at signal is present at WUS timing position 210C thereby causing PDSCH 120 to be received monitoring time 110C.

The foregoing wake-up mechanism can have other implementations as well. For example, a base station may send a "go to sleep" signal (GTS). If the GTS signal is detected, the terminal does not monitor PDCCH at the potential PDCCH monitoring point. Otherwise, DTX or PDCCH monitoring is performed. It may also be a scheduling indication. If the terminal detects that the indication is "1", then PDCCH monitoring is performed at the potential PDCCH monitoring point. If the indication is "0", PDCCH monitoring is not performed. In the disclosed subject matter, there is no particular distinction between the foregoing methods. As such the WUS may be used, or the GTS, or a scheduling indication information.

Using the above-mentioned wake-up mechanism, the terminal can skip PDCCH monitoring if it is not needed. Moreover, the frequency range of the WUS may be selected to be narrower than that of the PDCCH, the monitoring method is based on a sequence with low complexity, and the signal is monitored. Accordingly, one beneficial advantage of such embodiments is that the receiver power consumption is lower than that for PDCCH monitoring. In this way, reduction of power consumption can be achieved.

Example Embodiment 1

This following scheme details the wake-up mechanism proposed above.

For the above WUS, the terminal determines the time domain location sent by the WUS. Specifically, the terminal determines the time domain location sent by the WUS in at least one of the following ways:

Way 1: The time domain location sent in the WUS is determined by the WUS period and time domain offset configured by the base station. For example, the base station can configure a WUS slot cycle and a slot offset to determine a slot to send the WUS. The base station may reconfigure the resource configuration information of the WUS such as the time domain symbol in the slot. Location: The location of the resource element (RE) or resource block (RB) occupied by a time-domain symbol. The terminal determines the location of the time-frequency resource where the WUS is located.

Way 2: The base station configures a WUS-associated core channel resource set (CORESET) and/or search space through higher layer signaling. The WUS is in front of the associated CORESET and/or search space for M time units. The time unit is a symbol or a time slot. M is a fixed or high-level configured integer value.

If the time unit is a time slot, WUS is sent in the time slot, and the base station informs the WUS of the specific time-domain symbol position in the time slot and the position of the RE or RB occupied in a certain time-domain symbol through the configuration information. The terminal receives WUS at the corresponding location.

For example, the WUS configuration information is configured for each bandwidth part (BWP). The WUS configuration of each BWP includes cycle and time offset information, time and frequency domain location information, quasi co-location (QCL) related information, CORESET/SS related information, etc. The WUS indicated by the base station is only applied to the currently active BWP, that is, the terminal only monitors the WUS on the currently active BWP. The result of the monitoring WUS indicates whether the potential PDCCH monitoring point is detected on the currently active BWP.

Example Embodiment 2

This following scheme details another embodiment of the wake-up mechanism proposed above.

Figure 3:
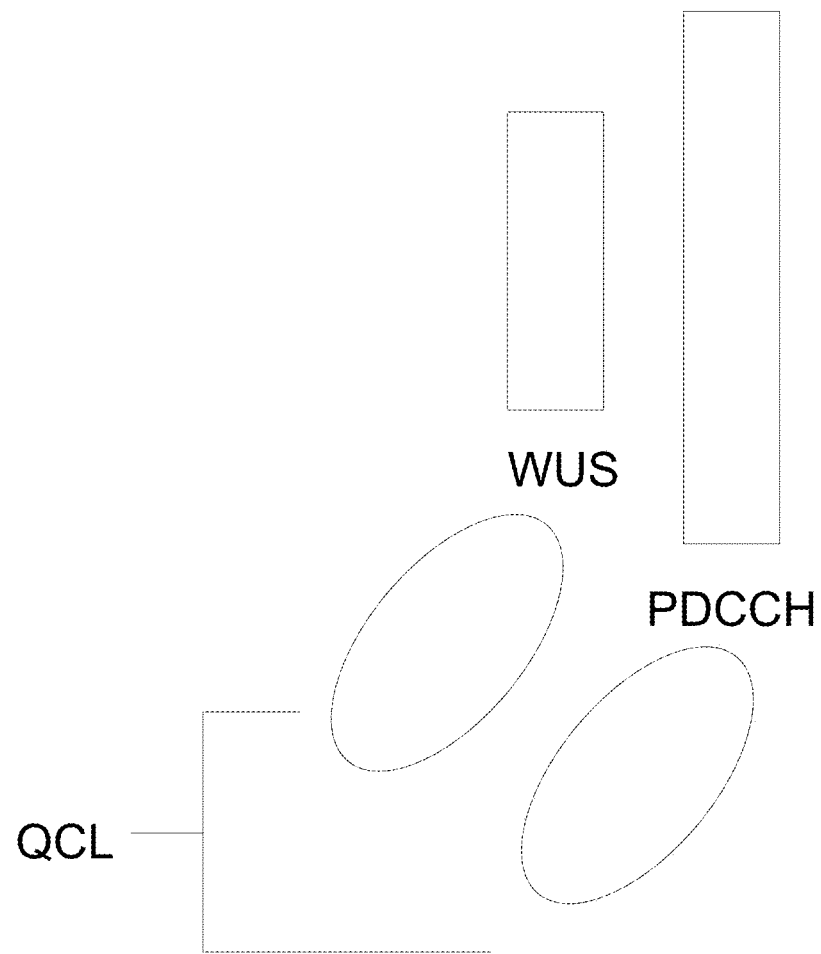
FIG. 3 depicts a determination of wake-up signal quasi co-location information, in accordance with some example embodiments.

For high-frequency or low-frequency operation, the terminal needs to know the WUS's QCL information for proper reception of the WUS. In the disclosed subject matter, the terminal may determine its QCL information through the WUS associated PDCCH. For example, terminals associated with the WUS monitor the CORESET and/or search space QCL for the same search space PBCH block (SSB) or channel state information reference signal (CSI-RS). If the WUS is associated with more than one CORESET and/or search space, the QCL is associated with the one with the lowest or highest CORESET ID or search space ID. The QCL described above, at least with respect to the spatial reception parameter QCL, may include at least one of the following parameter sets QCL: Doppler shift, Doppler spread, average delay, delay spread; Doppler shift, Doppler spread; Doppler shift, average delay. FIG. 3 depicts WUS QCL information determination in accordance with example embodiment 2. In some example embodiments, the WUS and PDCCH have the same QCL information.

By embodying the above method, the terminal can obtain at least one of the following methods to determine the QCL information of the WUS.

Method A

Before a potential PDCCH monitoring point, the CORESET ID or SS ID with the lowest or highest CORESET or SS QCL in the most recent WUS and all CORESETs or SSs contained in the monitoring point to the same SSB or CSI-RS.

Method B

The WUS configuration information includes a list of CORESETs or SSs indicating whether the potential CORESETs are monitored or the SSs need to be indicated by the WUS. Before a potential PDCCH monitoring point, the last WUS and the CORESET associated with the WUS in the monitoring point or SS QCL to the same SSB or CSI-RS. If the monitoring point contains multiple CORESETs or SSs, CORESET or SS with the lowest ID or highest ID is applied.

Method C

In the WUS configuration information, one or more WUS resources are configured. Each WUS resource includes at least one of the following information: time-frequency domain location information of the WUS resource, cycle and/or time offset and CORESET information associated with the WUS resource, or SS information. Then, each WUS resource and the CORESET or SS QCL associated with the resource go to the same SSB or CSI-RS.

Further, in an example, WUS satisfies at least one of the following properties: there is no more than one WUS in the same time domain symbol; WUS and SSB or CSI-RS QCL on the same time domain symbol; if there is more than one WUS in the same time domain symbol, the terminal ignores the WUS other than the WUS with the highest or lowest associated CORESET ID or SS ID. If more than one WUS exists on the same time domain symbol, then these WUSs all QCL to the CORESET or SS whose associated CORESET or SS ID is the highest or lowest.

The CSI-RS described in this scheme includes CSI-RS for channel tracking.

Example Embodiment 3

This scheme details the wake-up mechanism proposed above. The method in this solution transmits the multiple WUS resources to improve the reception accuracy of the WUS. The base station configures one or more WUS resources associated with the same potential PDCCH monitoring point, or the same CORESET or SS, that is, the WUS associations indicate whether the terminal monitors this potential PDCCH monitoring point (or CORESET, or SS). Each WUS resource may receive QCL parameters about space to one SSB or CSI-RS, and may be related to at least one of the following parameters to the SSB or CSI-RS: Doppler shift, Doppler spread, average delay, delay spread; Doppler shift, Doppler spread; Doppler shift, average delay.

Figure 4:
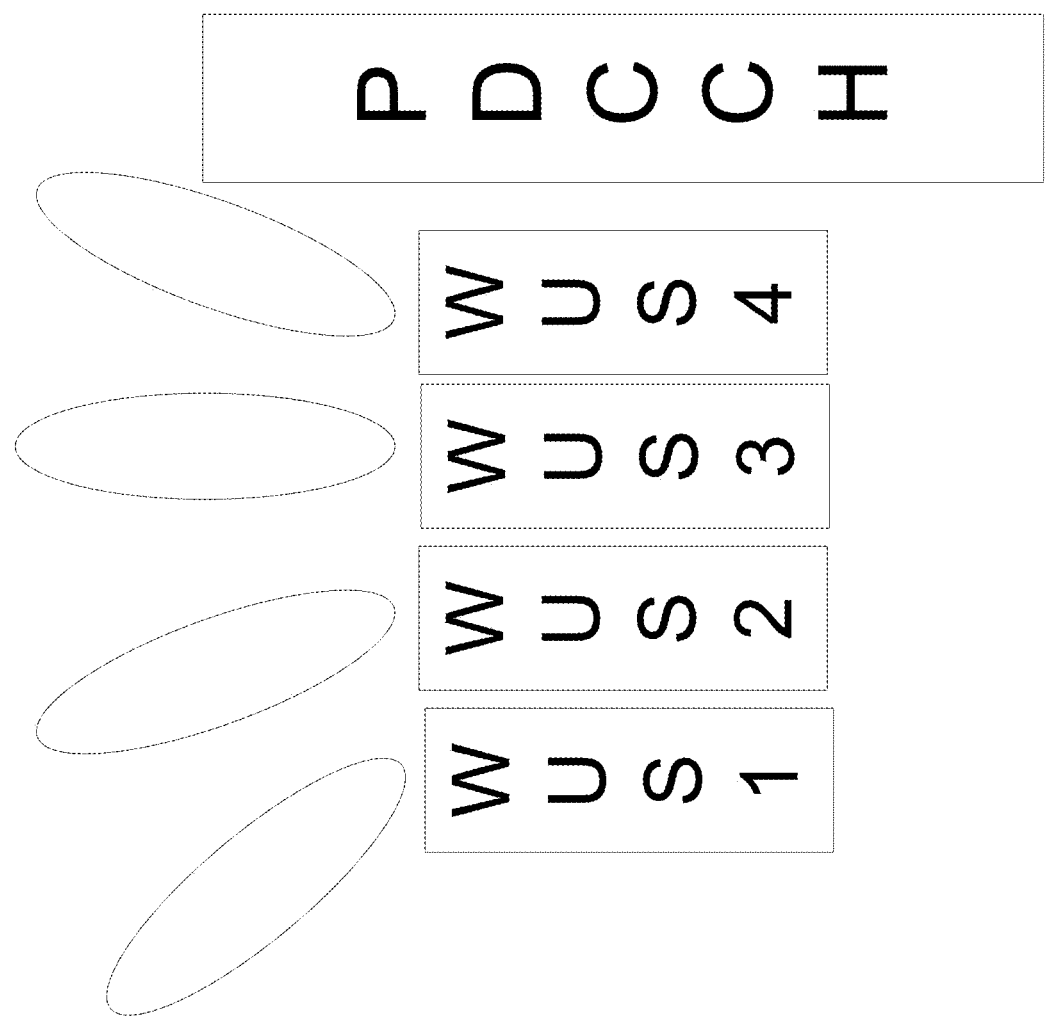
FIG. 4 depicts sending multiple WUS signals, in accordance with some example embodiments.

Specifically, the terminal can determine the information of one or more WUSs as shown in FIG. 4 in at least one of the following example ways:

Way 1:

The configuration information of the WUS includes configuration information of one or more WUS resources, and the configuration information of each WUS resource includes at least one of the following: time-frequency domain location information of the WUS resource, period and/or time offset, and the WUS resource QCL SSB or CSI-RS information. The terminal receives the WUS based on the above information.

Way 2:

The configuration information of the WUS includes the WUS set configuration information. WUS set configuration information includes at least one of the following: time and frequency domain location information of the WUS set (for example, the start time domain symbol position occupied by the WUS set, time domain number of symbols, RB or RE position in the slot, etc.), period and/or time offset of the WUS set, and SSB or CSI-RS information for each symbol QCL on the set of WUS. The terminal receives the WUS based on the above information.

The CSI-RS described in this scheme includes CSI-RS for channel tracking.

Figure 5:
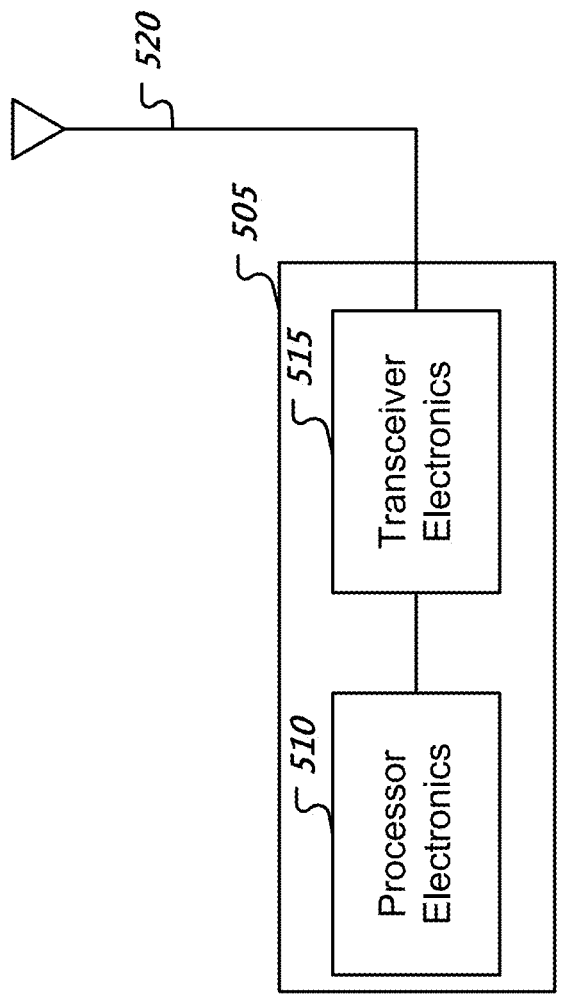
FIG. 5 is a block diagram representation of a portion of a radio station.

FIG. 5 depicts a block diagram representing of a portion of a radio station 505. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

Figure 6:
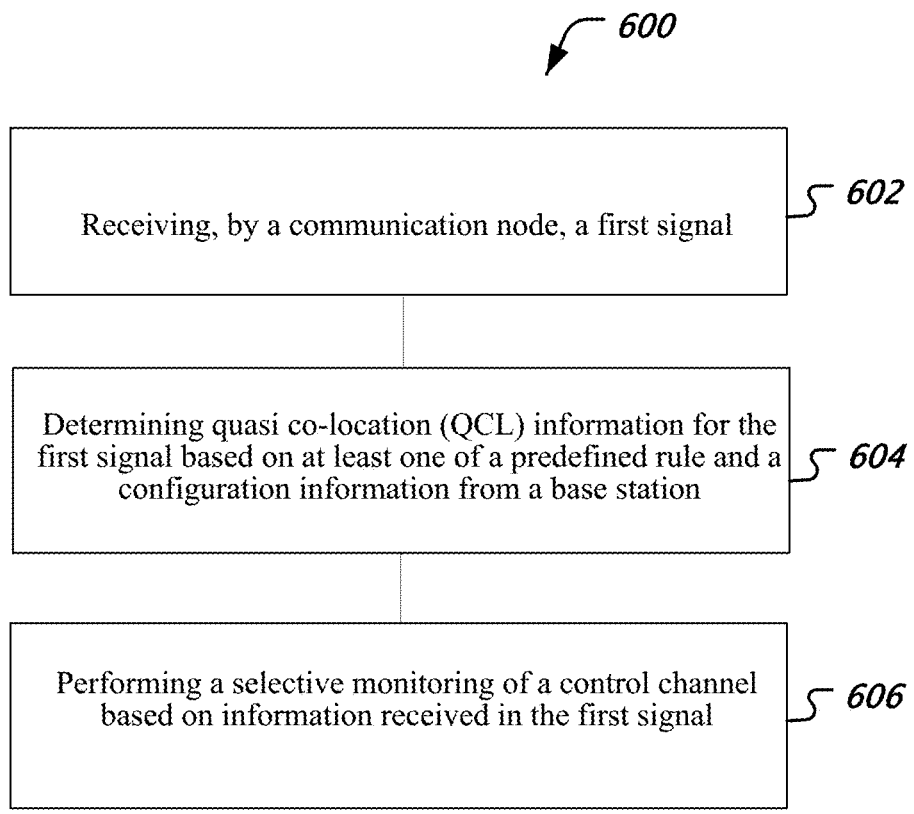
FIG. 6 is a flowchart representation of a method for wireless communication.

FIG. 6 is a flowchart representation of a method 600 for wireless communication. At 610, the wireless communication method includes receiving, by a communication node, a first signal. At 620, the wireless communication method includes determining quasi co-location (QCL) information for the first signal based on at least one of a predefined rule and a configuration information from a base station. At 630, the wireless communication method includes performing a selective monitoring of a control channel based on information received in the first signal. A predefined rule may be one of the rules described in the present document at the transmitting side or the receiving side (e.g., the base station or the UE). The UE may know the rule a priori or the base station may communicate the rule to the UE using a messaging mechanism such as a higher layer (e.g., RRC, or system information block) messaging mechanism.

Figure 7:
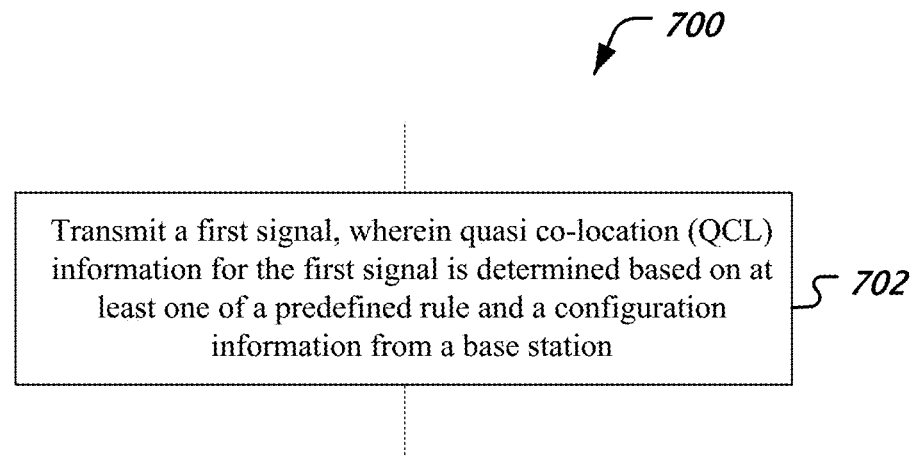
FIG. 7 is a flowchart representation of another method for wireless communication.

FIG. 7 is a flowchart representation of a method 700 for wireless communication. At 710, the method includes transmitting, by a network node such as a base station to a communication node such as a user equipment or terminal. The transmitting includes a first signal, wherein quasi co-location (QCL) information for the first signal is determined based on at least one of a predefined rule and a configuration information from a base station. The first signal provides the communication node information regarding performing a selective monitoring of a control channel.

The disclosed subject matter includes a user equipment (UE) apparatus. The UE/terminal determines whether to detect the PDCCH monitoring point according to the first signal sent by the base station. The terminal determines QCL information of the first signal according to the configuration of the base station and/or the agreed rules. The first signal is at least one of the following: WUS, GTS, and signals indicating whether or not to schedule information. The first signal QCL information is the SSB or CSI-RS information of the first signal QCL, and the QCL is the space receiving parameter QCL. The first signal QCL information is the SSB or CSI-RS information of the first signal QCL, and the QCL is at least one QCL about the following parameter set: Doppler shift, Doppler spread, mean delay, delay spread; Doppler shift, Doppler spread; Doppler shift, average delay. The first signal and its associated CORESET and/or search space QCL to the same SSB or CSI-RS. Prior to a potential PDCCH monitoring point, the lowest or highest ID of the CORESET or SS QCL of the most recent first signal and all CO RESET or SS contained in the monitoring point to the same SSB or CSI-RS. In the configuration information of the first signal, a list of CORESET or SS is configured to indicate whether the potential CORESET or SS needs to be monitored through the first signal. Before a potential PDCCH monitoring point, the last one of the first signal and the CORESET or SS QCL associated with the first signal in the monitoring point to the same SSB or CSI-RS. If there are multiple CORESETs or SSs in the monitoring point, apply the CORESET or SS with the lowest ID or highest ID to determine the QCL information. In the configuration information of the first signal, one or more first signal resources are configured, and each first signal resource includes at least one of the following information: time-frequency domain location information of the first signal resource, and the first signal resource period and/or time offset, CORESET information or SS information associated with the first signal resource. Each first signal resource and the associated CORESET or SS QCL of the resource to the same SSB or CSI-RS. The first signal satisfies at least one of the following properties: There is not more than one first signal on the same time domain symbol; the first signal and the SSB or CSI-RS QCL on the same time domain symbol; and if there is more than one first signal on the same time-domain symbol, the terminal ignores the first signal other than the first signal with the highest or lowest associated CORESET ID or SS ID. If there is more than one first signal on the same time domain symbol, these first signals and the highest or lowest CORESET or SS QCL to their associated CORESET or SS have the same SSB or CSI-RS. The base station configures one or more first signal resources associated with the same potential PDCCH monitoring point, or the same CORESET or SS. The base station configuration and SSB or CSI-RS information for each first signal resource QCL.

In some example embodiments, the logic of the QCL determination is rule based or based on configuration information. In the rule based approach, the infers the QCL information for the first signal based on the rule (same QCL as control channel) or another configuration information. The UE receives the first signal, and derives the information of whether the control channel reception should be performed or skipped from the detection of the first signal. UE performs or skips the reception of control channel based on the above information derived from the first signal. In the configuration information approach, the UE acquires the QCL information (SSB or CSI-RS information) based on the configuration of one or more first signal resources.

With reference to the method 600, the selective monitoring may include monitoring at selected times such that and non-selected times no monitoring is performed thereby enabling transmit, receive, and/or processing electronics to be turned-off thereby reducing power consumption of the communications node.

The performing the selective monitoring can include determining that the information received from the first signal indicates that the control channel is to be monitored and monitoring, upon the determining, the control channel. The performing the selective monitoring can include deciding that the information received from the first signal indicates that the control channel is to be skipped, and forgoing, upon the deciding, monitoring of the control channel.

The first signal can use a first number of transmission resources and the control channel signal can use a second number of transmission resources greater than the first number of transmissions resources. The QCL of the first signal can be the same as one or more of the CORESET and a search space of a control channel. The QCL information can include a synchronization signal (SS)/PBCH Block (SSB) or channel state information reference signal (CSI-RS) information of the first signal QCL information, and the QCL information can be a space receiving parameter QCL information. The information can includes quasi-co-location (QCL) information, and the QCL information can be a synchronization signal (SS)/PBCH Block (SSB) or channel state information reference signal (CSI-RS) information of the first signal QCL information. The QCL information can include at least one of a Doppler shift, a Doppler spread, a delay spread, and an average delay. The latest first signal before an occasion of one or more of the control channel resource set (CORESET) and search space (SS) can have the same QCL as the control channel resource set (CORESET) and/or search space (SS). The configuration information of the first signal, can include one or a list of CORESET and/or SS configured to indicate whether the CORESET and/or SS is monitored is determined by the first signal. The latest first signal before an occasion of the configured CORESET and/or SS associated with the first signal can have the same QCL as the CORESET and/or SS. When multiple CORESETs and/or search spaces are associated with a first signal, the first signal can have the same QCL as the associated CORESET and/or search space with the highest or lowest CORESET ID and/or search space ID. The configuration information of the first signal can include configuration information for one or more first signal resources, wherein each first signal resource includes at least one of the following information: time-frequency domain location information of the first signal resource, period and/or time offset of the first signal resource, CORESET information and/or SS information associated with the first signal resource. A first signal resource can have the same QCL as the configured CORESET and/or SS associated with the first signal resource. The first signal can satisfy at least one of the following: there is no more than one first signal on the same time domain symbol; the first signal has the same QCL with the SSB and/or CSI-RS on the same time domain symbol; if there is more than one first signal on a same time-domain symbol, the first signal other than the first signal with the highest or lowest associated CORESET ID and/or SS ID is ignored; or if there is more than one first signal on the same time domain symbol, the multiple first signals and the highest or lowest associated CORESET and/or SS have the same QCL. One or multiple first signal resources can be configured to indicate whether one or more of CORESET and search space is monitored is determined by the one or multiple first signal resources. A first signal resource can be configured to have same QCL with an SSB or CSI-RS.

With reference to the method 700, the performing the selective monitoring can include determining that the information received from the first signal indicates that the control channel is to be monitored, and monitoring, upon the determining, the control channel. The performing the selective monitoring can include deciding that the information received from the first signal indicates that the control channel is to be skipped, and forgoing, upon the deciding, monitoring of the control channel. The QCL information can include a synchronization signal (SS)/PBCH Block (SSB) or channel state information reference signal (CSI-RS) information of the first signal QCL information, and the QCL information can be a space receiving parameter QCL information. The QCL information can be a synchronization signal (SS)/PBCH Block (SSB) or channel state information reference signal (CSI-RS) information of the first signal QCL information, and the QCL information can include at least one of Doppler shift, Doppler spread, mean delay, delay spread, average delay. Configuration information of the first signal can include one or a list of CORESET and/or SS configured to indicate whether the CORESET or SS is monitored is determined by the first signal. Configuration information of the first signal can include configuration information for one or more first signal resources, wherein each first signal resource includes at least one of the following information: time-frequency domain location information of the first signal resource, period and/or time offset of the first signal resource, CORESET information and/or SS information associated with the first signal resource. One or multiple first signal resources can be configured to indicate whether one or more of CORESET and search space should be monitored is determined by the one or multiple first signal resources.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A wireless communication method, comprising:
receiving, by a communication node, a first signal;
determining quasi co-location (QCL) information for the first signal based on a configuration information from a base station,
wherein the configuration information of the first signal includes one or a list of control channel resource set

(CORESET) and/or search space (SS) configured to indicate whether the CORESET and/or SS is monitored, and wherein when multiple CORESETs and/or search spaces are associated with the first signal, the first signal has a same QCL as that of the associated CORESET and/or search space with a highest or lowest CORESET ID and/or search space ID; and performing a selective monitoring of a control channel based on information received in the first signal.

2. The method of claim 1, wherein the performing the selective monitoring includes:

performing a first determination that the information received from the first signal indicates that the control channel is to be monitored; and monitoring, upon the first determination, the control channel.

3. The method of claim 1, wherein the performing the selective monitoring includes:

deciding that the information received from the first signal indicates that the control channel is to be skipped; and forgoing, upon the deciding, monitoring of the control channel.

4. The method of claim 1, wherein the QCL of the first signal is the same as that of one or more of the CORESET and a search space of the control channel.

5. The method of claim 1, wherein the QCL information includes a synchronization signal (SS)/PBCH Block (SSB) or channel state information reference signal (CSI-RS) information of the first signal QCL information, and the QCL information is a space receiving parameter QCL information.

6. The method of claims 1, wherein the information includes quasi-co-location (QCL) information, and wherein the QCL information is a synchronization signal (SS)/PBCH Block (SSB) or channel state information reference signal (CSI-RS) information of the first signal QCL information, and the QCL information includes at least one of a Doppler shift, a Doppler spread, a delay spread, and an average delay.

7. The method of claim 1, wherein a latest of the first signal before an occasion of one or more of the control channel resource set (CORESET) and search space (SS) have a same QCL as that of the control channel resource set (CORESET) and/or search space (SS).

8. The method of claim 1, wherein a latest of the first signal before an occasion of the configured CORESET and/or SS associated with the first signal has a same QCL as that of the CORESET and/or SS.

9. The method of claim 1, wherein the configuration information of the first signal includes configuration information for one or more first signal resources, wherein each first signal resource includes at least one of the following information: time-frequency domain location information of the first signal resource, period and/or time offset of the first signal resource, CORESET information and/or SS information associated with the first signal resource.

10. The method of claim 9, wherein a first signal resource has a same QCL as that of the configured CORESET and/or SS associated with the first signal resource.

11. The method of claim 1, wherein the first signal satisfies at least one of the following:

there is no more than one first signal on the same time domain symbol;

the first signal has a same QCL with the SSB and/or CSI-RS on the same time domain symbol;

if there is more than one first signal on a same time-domain symbol, the first signal other than the first signal with the highest or lowest associated CORESET ID and/or SS ID is ignored; or if there is more than one first signal on the same time domain symbol, the multiple first signals and the highest or lowest associated CORESET and/or SS have a same QCL.

12. The method of claim 1, wherein one or multiple first signal resources are configured to indicate whether one or more of CORESET and search space is monitored.

13. The method of claim 12, wherein a first signal resource is configured to have same QCL with an SSB or CSI-RS.

14. A wireless communication method, comprising:

transmitting, by a base station to a communication node, a first signal, wherein quasi co-location (QCL) information for the first signal is based on a configuration information from the base station, wherein the configuration information of the first signal includes one or a list of control channel resource set (CORESET) and/or search space (SS) configured to indicate whether the CORESET and/or SS is monitored, and wherein when multiple CORESETs and/or search spaces are associated with the first signal, the first signal has a same QCL as that of the associated CORESET and/or search space with a highest or lowest CORESET ID and/or search space ID, and wherein the first signal provides the communication node information related to a selective monitoring of a control channel.

15. The method of claims 14, wherein the QCL information includes a synchronization signal (SS)/PBCH Block (SSB) or channel state information reference signal (CSI-RS) information of the first signal QCL information, and the QCL information is a space receiving parameter QCL information.

16. The method of claims 14, wherein the QCL information is a synchronization signal (SS)/PBCH Block (SSB) or channel state information reference signal (CSI-RS) information of the first signal QCL information, and the QCL information includes at least one of Doppler shift, Doppler spread, delay spread, average delay.

17. The method of claim 14, wherein the configuration information of the first signal includes configuration information for one or more first signal resources, wherein each first signal resource includes at least one of the following information: time-frequency domain location information of the first signal resource, period and/or time offset of the first signal resource, CORESET information and/or SS information associated with the first signal resource.

18. The method of claim 14, wherein one or multiple first signal resources are configured to indicate whether one or more of CORESET and search space should be monitored.

19. The method of claim 18, wherein a first signal resource is configured to have same QCL with an SSB or CSI-RS.

20. A wireless communication apparatus comprising a processor configured to:

receive, by a communication node, a first signal;

determine quasi co-location (QCL) information for the first signal based on a configuration information from a base station, wherein the configuration information of the first signal includes one or a list of control channel resource set (CORESET) and/or search space (SS) configured to indicate whether the CORESET and/or SS is monitored, and wherein when multiple CORESETs and/or search spaces are associated with the first signal, the first signal has a same QCL as that of the associated CORESET and/or search space with a highest or lowest CORESET ID and/or search space ID; and perform a selective monitoring of a control channel based on information received in the first signal.

21. The wireless communication apparatus of claim 20, wherein the selective monitoring is performed by the processor configured to:

perform a first determination that the information received from the first signal indicates that the control channel is to be monitored; and monitor, upon the first determination, the control channel.

22. The wireless communication apparatus of claim 20, wherein the selective monitoring is performed by the processor configured to:

decide that the information received from the first signal indicates that the control channel is to be skipped; and forgo, upon the decide, monitoring of the control channel.

23. A wireless communication apparatus comprising a processor configured to:

transmit, by a base station to a communication node, a first signal, wherein quasi co-location (QCL) information for the first signal is based on a configuration information from the base station, wherein the configuration information of the first signal includes one or a list of control channel resource set (CORESET) and/or search space (SS) configured to indicate whether the CORESET and/or SS is monitored, and wherein when multiple CORESETs and/or search spaces are associated with the first signal, the first signal has a same QCL as that of the associated CORESET and/or search space with a highest or lowest CORESET ID and/or search space ID, and wherein the first signal provides the communication node information related to a selective monitoring of a control channel.

24. The wireless communication apparatus of claim 23, wherein the QCL information includes a synchronization signal (SS)/PBCH Block (SSB) or channel state information reference signal (CSI-RS) information of the first signal QCL information, and the QCL information is a space receiving parameter QCL information.

* * * * *